(No Model.) 2 Sheets—Sheet 2.
L. H. COBB.
FRAME FOR BICYCLES.
No. 595,148. Patented Dec. 7, 1897.
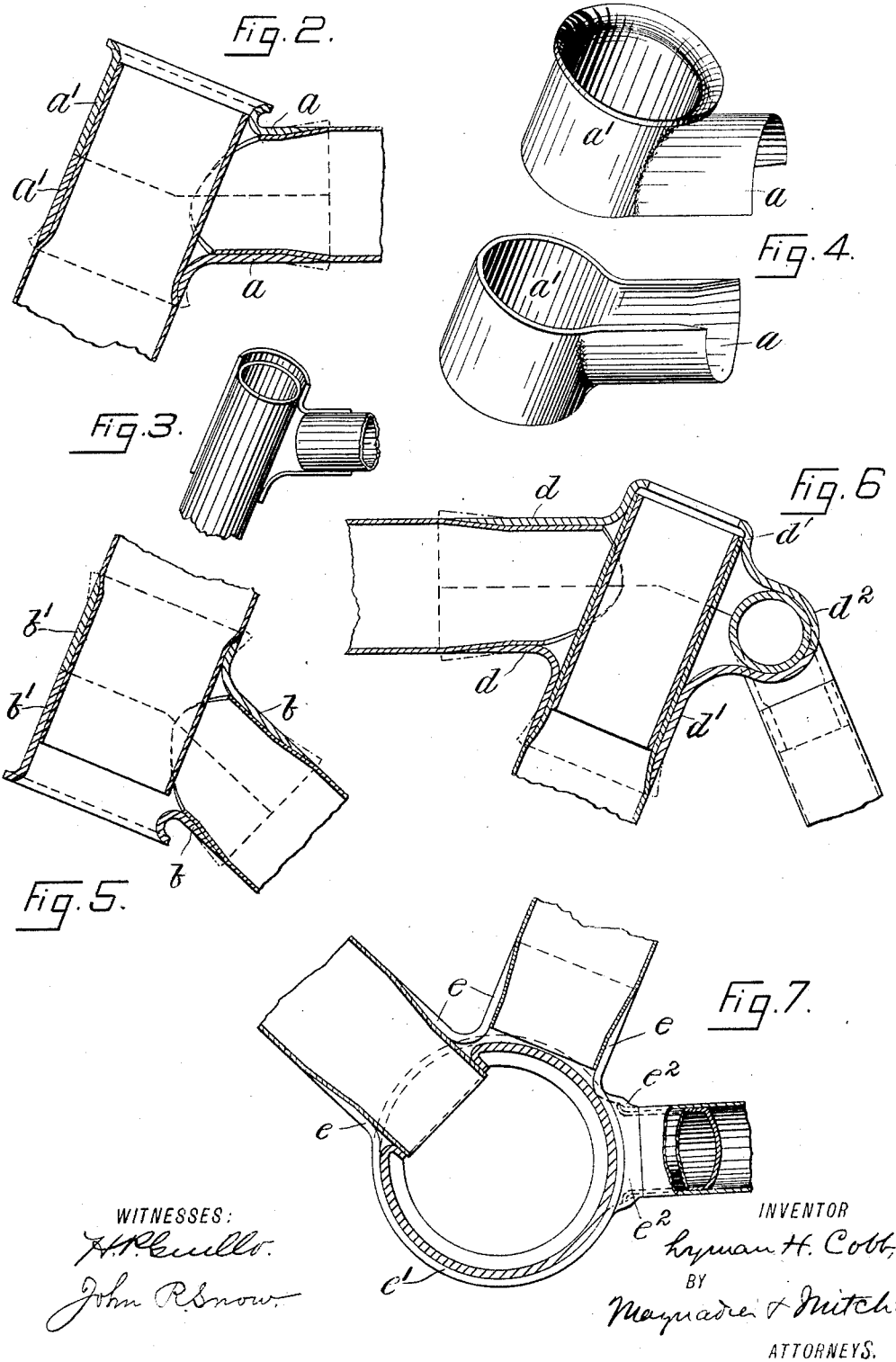

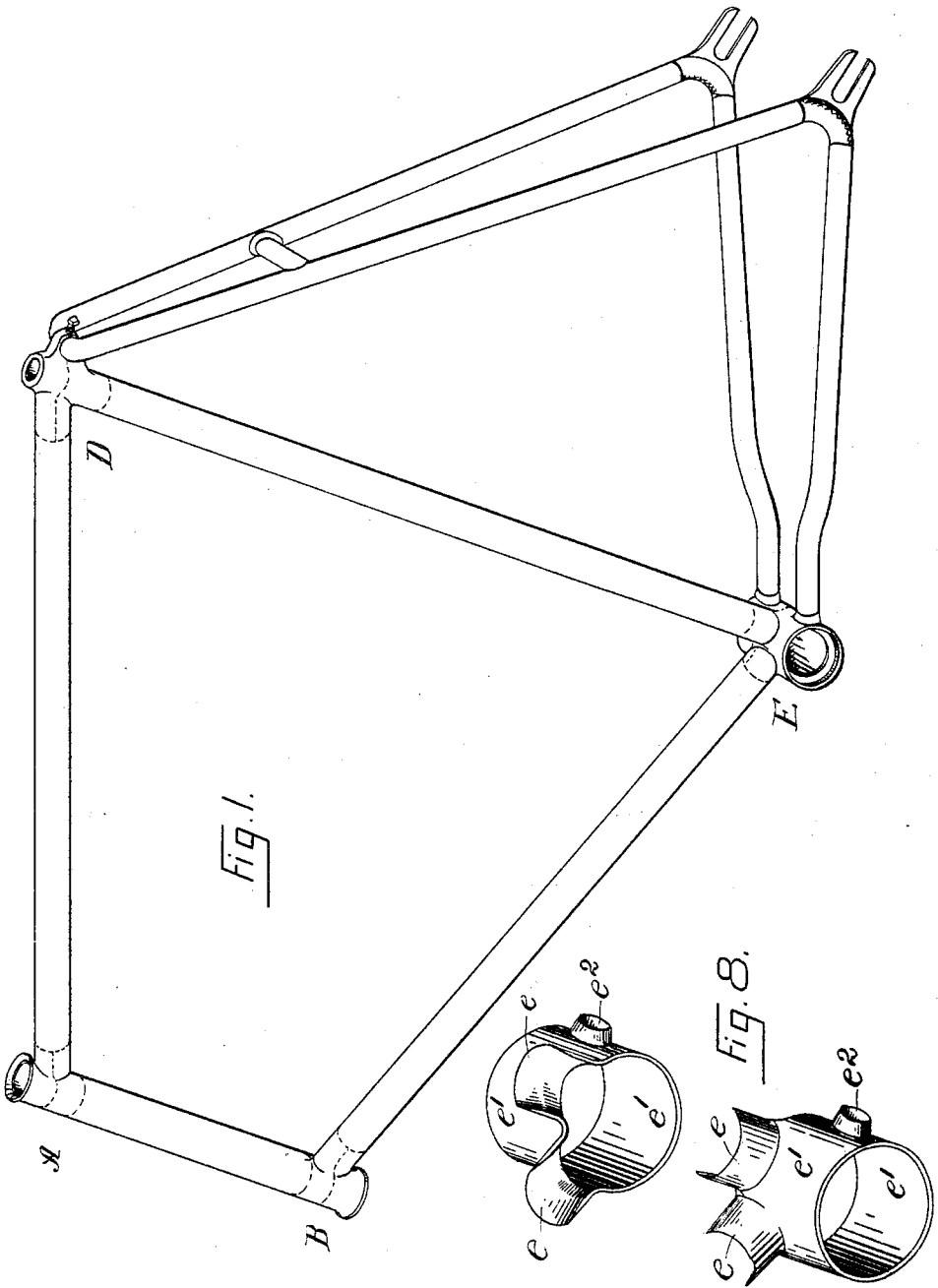

United States Patent Office.

LYMAN H. COBB, OF PORTLAND, MAINE, ASSIGNOR TO THE LOVELL CYCLE AND ETHER MOTOR COMPANY, OF SAME PLACE.

FRAME FOR BICYCLES.

SPECIFICATION forming part of Letters Patent No. 595,148, dated December 7, 1897.

Application filed September 30, 1896. Serial No. 607,428. (No model.)

*To all whom it may concern:*

Be it known that I, LYMAN H. COBB, of Portland, Cumberland county, Maine, have invented an Improved Frame for Bicycles and other Vehicles, of which the following is a specification, reference being had to the accompanying drawings, in which—

Figure 1 shows a complete frame embodying my invention. Fig. 2 shows the upper head connection of a bicycle in section. Fig. 3 shows the same connection as heretofore made. Fig. 4 shows the parts of the upper head connection in perspective. Fig. 5 shows the lower head connection in section. Fig. 6 shows the seat-post connection in section. Fig. 7 shows the crank-hanger connection in section. Fig. 8 shows the parts of the crank-hanger connection in perspective.

Bicycle-frames in which the lengths of tubing of which the frame is formed have been joined together by stamped sheet-metal connections, two or more stampings being brazed together to form one connection, are old; but in all connections heretofore made the stampings were so made that a joint divided every connection in such a manner that no length of tubing was surrounded by an unjointed ring of metal. In my improved connections this desirable result is attained, thus adding materially to the strength of the connection and in the case of the crank-hanger preventing the bursting of the hanger by the forcing into place of the ball-cases—a common result where the old-style stamped-metal-jointed crank-hanger was used. The means I employ to attain this result are best shown by reference to Figs. 2 and 3, which show the same connection formed according to my plan and according to the old plan, Fig. 3 being the latter and Fig. 2 the former. It will be observed that both arms of the connection in Fig. 3 when the connection is brazed together will be divided lengthwise by a joint, while only one arm of the connection shown in Fig. 2 is so divided, the other arm being formed of two solid rings of metal. The dies in forming a connection according to my invention press the sheet metal into two arms and into two tubes open at one end and closed at the other. The metal closing one end of the tube is then removed, leaving a tube $a'$ with a semitubular arm $a$ attached at one side and end. The connection as a whole is shown in Fig. 1 and marked A. This is the first feature of my invention.

Fig. 1 shows an entire bicycle-frame in which each connection as a whole is marked with a capital letter A B D E.

In Figs. 2 and 5 the parts of a connection are marked $a$ $a'$ $b$ $b'$, the connections being marked A and B, respectively.

In Fig. 6, the connection being marked D, the parts are marked $d$ $d'$, $d^2$ being a semitubular socket for the rear fork.

Figs. 7 and 8 show the crank-hanger embodying the first feature of my invention in its construction and having in addition the tubes $e^2$ projecting from it, which are pressed or drawn from the hanger after it has been pressed or drawn to embody the first feature of my invention. The two halves of the crank-hanger are placed in a suitable support having a hole or recess at the proper place, forming the female part of a die, and a lever carrying the male part of a die, which coöperates with the hole or recess first mentioned, is inserted within the half of the crank-hanger, and a tube $e^2$ is thus formed upon the surface of the hanger. The hanger so formed—that is, with these unjointed tubes projecting from its surface and integral with it—is another feature of my invention.

What I claim is—

1. The frame connection consisting of two tubes of metal, each tube having one or more semitubular arms attached at one end, each tube with its arms being secured to its complementary tube with its arms, to form the connection, substantially as described.

2. The bicycle crank-hanger consisting of two tubes of metal, each tube having two or more semitubular arms attached at one end and each tube being perforated and having said perforation surrounded by a smaller tube integral with the principal tube, the principal tubes being connected to form the crank-hanger, substantially as described.

LYMAN H. COBB.

Witnesses:
GUY W. DAVIS,
LIONEL COBB.